United States Patent
Shibata

(10) Patent No.: US 8,480,223 B2
(45) Date of Patent: Jul. 9, 2013

(54) INK FOR INKJET RECORDING AND IMAGE FORMING METHOD

(75) Inventor: Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

(21) Appl. No.: 12/868,753

(22) Filed: Aug. 26, 2010

(65) Prior Publication Data

US 2011/0069122 A1     Mar. 24, 2011

(30) Foreign Application Priority Data

Sep. 24, 2009   (JP) .................................. 2009-219656

(51) Int. Cl.
*B41J 2/01*         (2006.01)

(52) U.S. Cl.
USPC .............................. 347/100; 347/95; 347/101

(58) Field of Classification Search
USPC ................. 347/100, 95, 96, 101, 102, 88, 99, 347/20, 21, 9; 106/31.6, 31.13, 31.27; 523/160, 523/161
See application file for complete search history.

(56) References Cited

U.S. PATENT DOCUMENTS

| | | | |
|---|---|---|---|
| 2007/0216743 A1* | 9/2007 | Makuta et al. ................. | 347/100 |
| 2009/0088521 A1* | 4/2009 | Hosokawa et al. ............ | 524/558 |
| 2009/0202724 A1* | 8/2009 | Arai et al. ................... | 106/31.86 |
| 2009/0203833 A1* | 8/2009 | Sasada et al. ................. | 524/558 |
| 2009/0208652 A1  | 8/2009 | Sasada et al. | |

FOREIGN PATENT DOCUMENTS

| | | |
|---|---|---|
| EP | 1688465 A1 | 8/2006 |
| JP | 2004-123905 A | 4/2004 |
| JP | 2005-154549 A | 6/2005 |
| JP | 2005-179679 A | 7/2005 |
| JP | 2005-220352 A | 8/2005 |
| JP | 2009-79209 A | 4/2009 |
| JP | 2009-196184 A | 9/2009 |
| WO | WO 2009001967 A1 * | 12/2008 |

OTHER PUBLICATIONS

Partial English language translation of the following: Office action dated May 7, 2013 from the Japanese Patent Office in a Japanese patent application corresponding to the instant patent application.

* cited by examiner

*Primary Examiner* — Manish S Shah
(74) *Attorney, Agent, or Firm* — SOLARIS Intellectual Property Group, PLLC

(57) ABSTRACT

There is provided is an ink for inkjet recording, including: a pigment coated with a water-insoluble resin including a structural unit represented by the following formula (1) and a structural unit having an ionic group; a nitrogen-containing organic solvent; resin particles; and water, wherein a mass ratio [nitrogen-containing organic solvent/resin particles] is from 2.0 to 6.0:

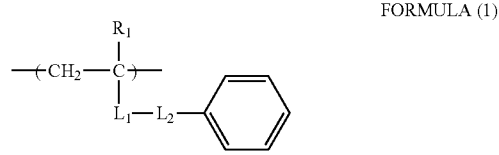

FORMULA (1)

wherein, in formula (1), $R_1$ represents a hydrogen atom, a methyl group, or a halogen atom; $L_1$ represents *—COO—, —OCO—, *—CONR$_2$—, *—O—, or a substituted or unsubstituted phenylene group, wherein "*—" represents a bond linking to the main chain; $R_2$ represents a hydrogen atom, or an alkyl group having 1 to 10 carbon atoms; and $L_2$ represents a single bond or a divalent linking group having 1 to 30 carbon atoms, and an image forming method.

20 Claims, No Drawings

INK FOR INKJET RECORDING AND IMAGE FORMING METHOD

CROSS-REFERENCE TO RELATED APPLICATION

This application claims priority under 35 USC 119 from Japanese Patent Application No. 2009-219656, filed on Sep. 24, 2009, the disclosure of which is incorporated by reference herein.

BACKGROUND OF THE INVENTION

1. Field of the Invention

The present invention relates to an ink for inkjet recording and an image forming method.

2. Description of the Related Art

A image forming method using an inkjet recording technology is a method involving applying a droplet of an ink for inkjet recording (ink) to a recording medium (substrate) to form an image. This method is characterized in that a high-definition and high-quality image can be printed at a high speed with a relatively inexpensive device.

Recently, there is known an aqueous ink which aims to improve water resistance or the like of an image and contains latex particles (called a "polymer colloid" or the like) (see, for example, see Japanese Patent Application Laid-Open (JP-A) No. 2005-179679).

Further, as the aqueous ink containing latex particles, there is also known an ink for inkjet recording containing a volatile co-solvent having a boiling point of 285° C. or lower, an acid-functionalized polymer colloid particles and a pigment coloring material (see, for example, JP-A No. 2005-220352). It is thought that such an ink can provide improvement of the adhesiveness of an image to a non-porous substrate (a film of a vinyl medium or the like).

SUMMARY OF THE INVENTION

The present invention has been made in view of the above circumstances and provides an ink for inkjet recording and an image forming method.

A first aspect of the present invention provides an ink for inkjet recording including a pigment coated with a water-insoluble resin including a structural unit represented by the following formula (1) and a structural unit having an ionic group, a nitrogen-containing organic solvent, resin particles, and water,
wherein a mass ratio [nitrogen-containing organic solvent/resin particles] is from 2.0 to 6.0:

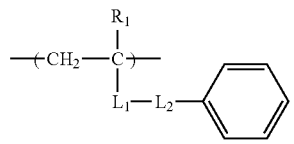

FORMULA (1)

wherein in the formula (1), $R_1$ represents a hydrogen atom, a methyl group, or a halogen atom, $L_1$ represents *—COO—, *—OCO—, *—CONR$_2$—, *—O—, or a substituted or unsubstituted phenylene group, wherein "*—" represents a bond linking to the main chain; $R_2$ represents a hydrogen atom or an alkyl group having 1 to 10 carbon atoms; and $L_2$ represents a single bond or a divalent linking group having 1 to 30 carbon atoms.

A second aspect of the present invention provides an image forming method involving applying the ink for inkjet recording according to the first aspect of the present invention to a non-porous substrate.

DETAILED DESCRIPTION OF THE INVENTION

Ink for Inkjet Recording

The ink for inkjet recording of the present invention (hereinafter also referred to as the "ink") includes a pigment coated with a water-insoluble resin containing a structural unit represented by the following formula (1) and a structural unit having an ionic group, nitrogen-containing organic solvent, resin particles, and water, wherein the mass ratio of the nitrogen-containing organic solvent to the resin particles each contained therein [nitrogen-containing organic solvent/resin particles] is 2.0 to 6.0. The water-insoluble resin containing a structural unit represented by the following formula (1) and a structural unit having an ionic group is also referred to as a "specific water-insoluble resin".

In the present invention, if the mass ratio [nitrogen-containing organic solvent/resin particles] is less than 2.0, the image defect worsens. Further, if the mass ratio [nitrogen-containing organic solvent/resin particles] is more than 6.0, the image defect worsens.

From the viewpoint of the image defect inhibition, the mass ratio [nitrogen-containing organic solvent/resin particles] is preferably 3.0 to 5.0.

Hereinafter, the respective components of the present invention will be described.

<Pigment Coated with Specific Water-Insoluble Resin>

The ink of the present invention contains a pigment coated with a specific water-insoluble resin.

By this, the dispersibility of the pigment in the ink is improved, and at the same time, the ejection stability of the ink is improved.

(Specific Water-Insoluble Resin)

The specific water-insoluble resin of the present invention contains a structural unit represented by the following formula (1) and a structural unit having an ionic group.

The specific water-insoluble resin is coated on the pigment. Specifically, the specific water-insoluble resin is preferably used as a dispersant for a pigment.

~Structural unit Represented by Formula (1)~

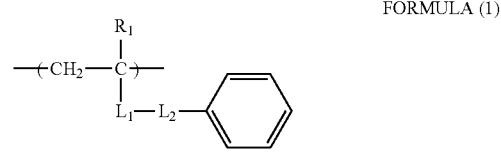

FORMULA (1)

In the formula (1), $R_1$ represents a hydrogen atom, a methyl group, or a halogen atom, $L_1$ represents *—COO—, *—OCO—, *—CONR$_2$—, *—O—, or a substituted or unsubstituted phenylene group, and $R_2$ represents a hydrogen atom or an alkyl group having 1 to 10 carbon atoms. "*—" in $L_1$ represents a bond linking to the main chain. $L_2$ represents a single bond or a divalent linking group having 1 to 30 carbon atoms.

The structural unit represented by the formula (1) (repeating unit) is a hydrophobic structural unit.

Specifically, a phenyl group (benzene ring) which is a hydrophobic functional group has a structure binding to a main chain via linking group represented by "-$L_1$-$L_2$-". This structure allows the distance between the phenyl group which is a hydrophobic functional group and an ionic group to be described later in the specific water-insoluble resin to be suitably maintained. Therefore, the interaction between the specific water-insoluble resin and the pigment easily occurs, whereby the both are rigidly adsorbed, and as a result, dispersibility of the pigment is improved.

In the formula (1), $R_1$ is preferably a hydrogen atom or a methyl group.

Examples of the substituent in the substituted phenylene group include a halogen atom, an alkyl group, an alkoxy group, a hydroxyl group, a cyano group, and the like, but the substituent is not particularly limited thereto.

$L_1$ is preferably *—COO—.

The divalent linking group represented by $L_2$ may be saturated or unsaturated, may be a structure having a straight chain structure, a branched structure, or a ring structure, or may be a structure containing a hetero atom selected from O, N, and S.

$L_2$ is preferably a divalent linking group having 1 to 25 carbon atoms, more preferably a divalent linking group having 1 to 20 carbon atoms, even more preferably a divalent linking group having 1 to 15 carbon atoms, and particularly preferably a divalent linking group having 1 to 12 carbon atoms.

More specifically, the divalent linking group represented by $L_2$ is an alkylene group or oxyalkylene group having 1 to 25 carbon atoms, preferably an alkylene group or oxyalkylene group having 1 to 20 carbon atoms, more preferably an alkylene group or oxyalkylene group having 1 to 15 carbon atoms, and particularly preferably an alkylene group or oxyalkylene group having 1 to 12 carbon atoms. Here, the direction of the oxyalkylene group is preferably a direction in which an oxygen atom contained in the oxyalkylene group binds to a phenyl group in the formula (1).

In the formula (1), a combination of the structural unit in which $R_1$ is a hydrogen atom or a methyl group, $L_1$ is *—COO—, and $L_2$ is a divalent linking group having 1 to 15 carbon atoms is preferable, and a combination of the structural unit in which $R_1$ is a hydrogen atom or a methyl group, $L_1$ is *—COO—, $L_2$ is an alkylene group or oxyalkylene group having 1 to 12 carbon atoms is more preferable.

The structural unit represented by the formula (1) is preferably a structural unit derived from the following monomer (that is, a structural unit formed by polymerization of the corresponding monomer).

That is, examples of the corresponding monomer include at least one selected from benzyl(meth)acrylate, phenoxyethyl (meth)acrylate, and oligo (having about 2 to 6 structural units) ethylene glycol monophenyl ether(meth)acrylates.

Furthermore, in the present invention, the (meth)acrylate is an expression referring to an acrylate or methacrylate. Further, the (meth)acrylic acid is an expression referring to an acrylic acid or methacrylic acid.

The corresponding monomer is preferably benzyl(meth)acrylate or phenoxyethyl(meth)acrylate from the viewpoints of dispersion stability and ejection stability.

The content of the structural unit represented by the formula (1) in the specific water-insoluble resin is preferably 50% by mass to 95% by mass from the viewpoint of dispersibility of the pigment.

More specifically, if the specific water-insoluble resin is constituted only by the structural unit represented by the formula (1) and structural unit having an ionic group (that is, if it does not contain other constituting units to be described later), the content of the structural unit represented by the formula (1) is preferably 70% by mass to 95% by mass, and more preferably 80% by mass to 95% by mass from the viewpoint of dispersibility of the pigment.

Further, if the specific water-insoluble resin contains other constituting units, the content of the structural unit represented by the formula (1) preferably 50% by mass to 80% by mass, and more preferably 60% by mass to 80% by mass, from the viewpoint of dispersibility of the pigment.

~Structural Unit with Ionic Group~

The structural unit having an ionic group (repeating unit) is a hydrophilic structural unit.

In the structural unit, dispersibility of the pigment in the ink containing water is improved.

Examples of the ionic group include anionic groups such as a carboxy group, a sulfonic acid group, a phosphoric acid group, and the like, and cationic groups such as an amino group, an ammonium group, and the like, and among these, at least one of the anionic group selected from a carboxy group, a sulfonic acid group, and a phosphoric acid group is preferable.

The structural unit having an ionic group may be a structural unit obtained by polymerization of an ionic group-containing monomer, or may be a structural unit obtained by introducing an ionic group (anionic group or cationic group) into a polymer main chain having no ionic group.

Examples of the anionic group-containing monomer and the cationic group-containing monomer which can be used in the present invention include the following, but not limited thereto.

Among the anionic group-containing monomers, examples of those containing a carboxy group include unsaturated carboxylic acid monomers such as acrylic acid, methacrylic acid, crotonic acid, itaconic acid, maleic acid, fumaric acid, citraconic acid, and the like, β-carboxyethylacrylic acid, 2-methacryloyloxymethyl succinic acid, and the like. Examples of the sulfonic acid group-containing monomer include styrene sulfonic acid, 2-acylamide-2-methylpropane sulfonic acid, 3-sulfopropyl(meth)acrylate, bis-(3-sulfopropyl)-itaconic acid ester and the like. Examples of the phosphoric acid group-containing monomer include vinyl phosphonic acid, vinyl phosphate, bis(methacryloxyethyl) phosphate, diphenyl-2-acryloyloxyethylphosphate, diphenyl-2-methacryloyloxyethylphosphate, dibutyl-2-acryloyloxyethylphosphate, and the like.

Examples of the cationic group-containing monomer include at least one selected from the group consisting of a tertiary amine-containing vinyl monomer and an ammonium salt-containing vinyl monomer.

Examples of the tertiary amine-containing vinyl monomer include N,N-dimethylaminoethyl(meth)acrylate, N,N-dimethylaminopropyl(meth)acrylate, N,N-diethylaminoethyl (meth)acrylate, N,N-dimethylaminopropylacryl(meth) amide, vinylpyrrolidone, 2-vinylpyridine, 4-vinylpyridine, 2-methyl-6-vinylpyridine, 5-ethyl-2-vinylpyridine, and the like.

Examples of the ammonium salt-containing vinyl monomer include a quaternized product of N,N-dimethylaminoethyl(meth)acrylate, a quaternized product of N,N-diethylaminoethyl(meth)acrylate, a quaternized product of N,N-dimethylaminopropyl(meth)acrylate, and the like.

Among these, an anionic monomer is preferred. From the viewpoint of viscosity and ejection property of the ink, unsaturated carboxylic acid monomers are preferred, and an acrylic acid and methacrylic acid is particularly preferred. In addition, each of the ionic group-containing monomers may be used alone or in a combination of two or more kinds thereof.

The content of the structural unit having an ionic group in the specific water-insoluble resin is preferably 2% by mass to 20% by mass, more preferably 2% by mass to 15% by mass, and particularly preferably 5% by mass to 15% by mass, from the viewpoint of dispersibility of the pigment, whether the structural unit contains other structural units to be described later or not.

If the content is within the above-described range, dispersibility of the pigment and ejection stability of the ink are further improved.

~Other Structural Units~

The specific water-insoluble resin of the present invention may contain other structural units, in addition to the structural unit represented by the formula (1) and the structural unit having an ionic group.

The other structural unit may be a hydrophobic structural unit or a hydrophilic structural unit, may contain a single structural unit or two or more kinds of structural units, and may contain both of the hydrophilic structural unit and the hydrophobic structural unit.

If the other structural unit is a hydrophobic structural unit, the other structural unit can be formed by polymerization of the monomers corresponding to the hydrophobic structural units. Further, after the polymerization to the polymer, a hydrophobic functional group may be introduced into the polymer main chain.

The monomer in the case where the other structural unit is a hydrophobic structural unit is not particularly limited, provided that it has a functional group capable of forming a polymer and a hydrophobic functional group, and thus, any such monomer can be used.

The monomer corresponding to the hydrophobic structural unit is preferably vinyl monomers ((meth)acrylates, (meth)acrylamides, styrenes, vinyl esters, or the like) from the viewpoints of availability, handleability, and general versatility.

Examples of the (meth)acrylates include alkyl(meth)acrylates such as methyl(meth)acrylate, ethyl(meth)acrylate, (iso)propyl(meth)acrylate, (iso or tert)butyl(meth)acrylate, 2-ethylhexyl(meth)acrylate, (iso)octyl(meth)acrylate, (iso)decyl(meth)acrylate, (iso)stearyl(meth)acrylate, and the like, and among these, alkyl esters having 1 to 4 carbon atoms of (meth)acrylic acids are preferable.

Examples of the (meth)acrylamides include (meth)acrylamides such as N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, vinyl(meth)acrylamide, N,N-diallyl(meth)acrylamide, N-aryl(meth)acrylamide, and the like, and among these, (meth)acrylamide and N,N-dimethyl(meth)acrylamide are preferable.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, and hydroxystyrene, methyl vinylbenzoate, and α-methyl styrene, which are protected by a group (for example, t-Boc and the like) deprotectable by an acidic material, vinylnaphthalene, and the like.

Further, as the styrenes, a styrene-based macromer is also suitable.

As the styrene-based macromer, a monomer containing a polymerizable unsaturated group having a number-average molecular weight of 500 to 100000, and preferably 1000 to 10000 is suitable.

Among these, a styrene-based macromer having a polymerizable functional group at one end thereof is preferable.

The styrene-based macromer can be suitably used from the viewpoint of sufficient adsorption of a pigment on a specific water-insoluble resin. Examples of the styrene-based macromer include a styrene homopolymer having a polymerizable functional group at one end thereof or a copolymer with a monomer other than styrene. Among these, those having an acryloyloxy group or methacryloyloxy group as a polymerizable functional group at one end thereof are preferable. The styrene content in the copolymer is 60% by mass or more, and preferably 70% by mass or more, from the viewpoint of sufficient incorporation of the pigment in the water-insoluble polymer. Examples of other monomers include acrylonitrile and the like.

As a styrene-based macromer, one obtained by suitable synthesis may be used or a commercially available product may be used.

Examples of the commercially available product of the styrene-based macromer include AS-6S (styrene homopolymerization macromer, number-average molecular weight: 6000, polymerizable functional group: methacryloyloxy group) manufactured by Toagosei Co., Ltd., AN-6S (styrene acrylonitrile copolymerization macromer, styrene content: 75% by mass, number-average molecular weight: 6000, polymerization functional group: methacryloyloxy group) manufactured by Toagosei Co., Ltd., and the like.

Among them, as the styrenes, styrene, α-methylstyrene, or a styrene-based macromer is preferable, and a styrene-based macromer is particularly preferable, from the viewpoint of dispersion stability.

Examples of the vinyl esters include the vinyl esters such as vinyl acetate, vinyl chloroacetate, vinyl propionate, vinyl butyrate, vinyl methoxy acetate, vinyl benzoate, and the like, and among these, vinyl acetate is preferable.

As a monomer corresponding to the hydrophobic structural unit, an alkyl ester having 1 to 4 carbon atoms of a (meth)acrylic acid is particularly preferable.

If the other structural unit is a hydrophilic structural unit, other structural units are preferably structural units having a nonionic hydrophilic group.

Further, the hydrophilic structural unit can be formed by polymerization of the monomer corresponding thereto, but after polymerization of the polymer, a hydrophilic functional group may be introduced to the polymer chain.

The monomer corresponding to the hydrophilic structural unit is not particularly limited, provided that it has a functional group capable of forming a polymer and a nonionic hydrophilic functional group, and any known monomers may be used. However, from the viewpoints of availability, handleability, and general versatility, vinyl monomers are preferable.

Examples of these vinyl monomer include (meth)acrylates, (meth)acrylamides and vinyl esters, all of which have a hydrophilic functional group. Examples of the hydrophilic functional groups include a hydroxyl group, an amide group (of which nitrogen atom is not substituted), and alkylene oxide polymers such as polyethylene oxide, polypropylene oxide, and the like as described below. Among these, hydroxyethyl(meth)acrylate, hydroxybutyl(meth)acrylate, (meth)acrylamide, and (meth)acrylate containing an alkylene oxide polymer are particularly preferable.

The monomer corresponding to the hydrophilic structural unit preferably contains a hydrophilic structural unit having an alkylene oxide polymer structure.

From the viewpoint of hydrophilicity and hydrophobicity, the alkylene of the alkylene oxide polymer preferably has 1 to 6 carbon atoms, more preferably has 2 to 6 carbon atoms, and particularly preferably has 2 to 4 carbon atoms.

Further, the degree of polymerization of the alkylene oxide polymer is preferably 1 to 120, more preferably 1 to 60, and particularly preferably 1 to 30.

The hydrophilic structural unit is also preferably an exemplary embodiment of a hydrophilic structural unit containing a hydroxyl group.

The number of hydroxyl groups in this exemplary embodiment is not particularly limited, and from the viewpoint of hydrophilicity and hydrophobicity of the specific water-insoluble resin and compatibility with a solvent or other monomers during polymerization, the number of the hydroxyl groups is preferably 1 to 4, more preferably 1 to 3, and particularly preferably 1 to 2.

If the specific water-insoluble resin of the present invention contains other structural units, the content of other structural units in the specific water-insoluble resin is preferably 5% by mass to 40% by mass, more preferably 10% by mass to 40% by mass, and particularly preferably 15% by mass to 30% by mass.

The specific water-insoluble resin of the present invention has been described above, but it may be a random copolymer where the respective structural units are introduced irregularly or a block copolymer where the respective structural units are introduced regularly. When the specific water-insoluble resin of the present invention is a block copolymer, the respective structural units may be synthesized in any introduction order, and the same kind of constituents may be used twice or more for forming the respective structural units. In consideration of general versatility and preparation property, the specific water-insoluble resin of the present invention is preferably a random copolymer.

The acid value of the specific water-insoluble resin of the present invention is preferably 30 mg KOH/g to 100 mg KOH/g, more preferably 30 mg KOH/g to 85 mg KOH/g, and particularly preferably 40 mg KOH/g to 85 mg KOH/g, from the viewpoints of pigment dispersibility and storage stability.

In addition, the acid value is defined a mass (mg) of KOH required to neutralize 1 g of the water-insoluble resin completely, and measured in accordance with a method as described in JIS Standard (JISK0070, 1992).

Furthermore, the molecular weight range of the specific water-insoluble resin used in the present invention is preferably 10000 to 300000, more preferably 20000 to 200000, and most preferably 30000 to 100000, in terms of a weight-average molecular weight (Mw), from the viewpoint of a steric repulsion effect.

If the molecular weight is within the range, the steric repulsion effect as a dispersant is easily improved, and also it is promoted that it does not take time for adsorption on the coloring material from a steric effect, which is thus desirable. Further, if the molecular weight is 100000 or less, the solution viscosity is not too high and handling gets easier, and the molecular weight of 30000 or more improves stability over time.

Further, the molecular weight distribution (represented in terms of the ratio of the weight-average molecular weight value/the number-average molecular weight value) of the polymer used in the present invention is preferably 1 to 6, and more preferably 1 to 4.

The molecular weight distribution in the above-described range is desirable from the viewpoints of reduction in dispersion time of the pigment and stability over time of the dispersion. Herein, the number-average molecular weight and the weight-average molecular weight are molecular weights as represented by detecting by use of a GPC analyzer that uses columns of TSKgel GMHxL, TSKgel G4000HxL, and TSKgel G2000HxL (trade names, all manufactured by Tosoh Corporation) with a THF solvent and a differential refractive index meter, followed by converting measured values in terms of polystyrene as a reference material.

The specific water-insoluble resin used in the present invention can be synthesized according to a variety of polymerization methods such as solution polymerization, precipitation polymerization, suspension polymerization, bulk polymerization, or emulsion polymerization. The polymerization reaction may be carried out according to a known operation such as a batch operation, a semicontinuous operation, a continuous operation, and the like.

Examples of a starting method of the polymerization include a method that uses a radical initiator, a method where light or radiation is illuminated, and the like. The polymerization methods and starting methods of the polymerization are described in, for example, T. Turuta "Kobunshi Gousei Houhou" revised edition (Nikkan Kogyo Shinbun, 1971) and T. Ohtu and M. Kinoshita "Koubunshi Gousei no Jikkenhou" Kagaku Dojin, 1972, pp. 124 to 154.

Among the polymerization methods, a solution polymerization process that uses in particular a radical initiator is preferred. Examples of the solvents used in the solution polymerization process include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. Each of the solvents may be used alone or in a combination of two or more kinds thereof, or as a mixture solvent of any of these and water.

It is required to set the polymerization temperature according to the molecular weight of the resulting polymer, the type of an initiator, or the like, and the polymerization temperature is usually is about 0° C. to 100° C., but it is preferable to carry out polymerization at a temperature in the range of 50 to 100° C.

The reaction pressure can be appropriately selected, but it is usually about 1 to 100 kg/cm$^2$, particularly preferably about 1 to 30 kg/cm$^2$. The reaction time is about 5 to 30 hours. The obtained polymer may be subjected to purification such as reprecipitation and the like.

Specific examples of the preferable specific water-insoluble resin of the present invention are shown as below, but the present invention is not intended to be limited thereto.

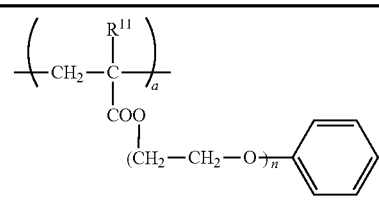

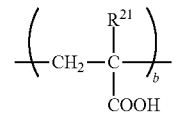

-continued

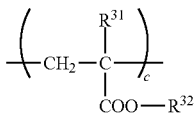

(a, b, and c each represent the respective composition (% by mass))

| | $R^{11}$ | n | $R^{21}$ | $R^{31}$ | $R^{32}$ | a | b | c | Mw |
|---|---|---|---|---|---|---|---|---|---|
| B-1 | CH₃ | 1 | CH₃ | CH₃ | —CH₃ | 60 | 9 | 31 | 35500 |
| B-2 | H | 1 | H | H | —CH₂CH₃ | 69 | 10 | 21 | 41200 |
| B-3 | CH₃ | 2 | CH₃ | CH₃ | —CH₃ | 70 | 11 | 19 | 68000 |
| B-4 | CH₃ | 4 | CH₃ | CH₃ | —CH₂(CH₂)CH₃ | 70 | 7 | 23 | 72000 |
| B-5 | H | 5 | H | H | —CH₃ | 70 | 10 | 20 | 86000 |
| B-6 | H | 5 | H | H | —CH₂CH(CH₃)CH₃ | 70 | 2 | 28 | 42000 |
| B-7 | CH₃ | 1 | CH₃ | CH₃ | —CH₂CH₃ | 50 | 11 | 39 | 44500 |
| B-8 | CH₃ | 1 | CH₃ | CH₃ | —CH₂CH₃ | 50 | 10 | 40 | 51200 |
| B-9 | H | 1 | H | H | —CH₂CH₃ | 45 | 11 | 44 | 48900 |
| B-10 | H | 1 | CH₃ | CH₃ | —CH₂CH₃ | 45 | 12 | 43 | 43600 |
| B-11 | CH₃ | 1 | CH₃ | CH₃ | —CH₃ | 67 | 13 | 20 | 49400 |

B-12

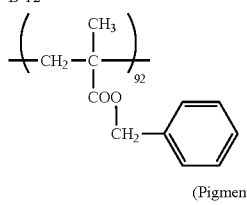
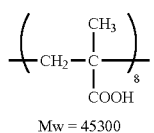

Mw = 45300

(Pigment)

The pigment of the present invention is coated with the specific water-insoluble resin.

The pigment is not particularly limited, and it can be appropriately selected depending on the purpose and may be any one of an organic pigment and an inorganic pigment.

Examples of the organic pigment include an azo pigment, a polycyclic pigment, a dye chelate, a nitro pigment, a nitroso pigment, an aniline black, and the like. Among these, an azo pigment, a polycyclic pigment, and the like are more preferred. Examples of the azo pigment include an azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like. Examples of the dye chelate include a basic dye chelate, an acidic dye chelate, and the like.

Examples of the inorganic pigment include titanium oxide, iron oxide, calcium carbonate, barium sulfate, aluminum hydroxide, barium yellow, cadmium red, chrome yellow, carbon black, and the like. Among these, carbon black is particularly preferred. In addition, examples of carbon black include those prepared by a known method such as a contact method, a furnace method, a thermal method, and the like.

Specific examples of the carbon black include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060, Raven 700 (trade name, all manufactured by Colombian•Carbon Corp.), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (trade name, all manufactured by Cabot Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4 A, Special Black 4 (trade name, all manufactured by Degussa), No. 25, No. 33, No. 40, No. 45, No. 47, No. 52, No. 900, No. 2200 B, No. 2300, MCF-88, MA600, MA7, MA8, MA100 (trade name, all manufactured by Mitsubishi Chemical Corp.), and the like, but not limited thereto.

The organic pigment which can be used in the present invention is as follows. Example of the pigment of the yellow ink include C.I. Pigment Yellow 1, 2, 3, 4, 5, 6, 7, 10, 11, 12, 13, 14, 14 C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, and the like, a pigment having an azo skeleton is preferable, and particularly, C.I. Pigment Yellow 74 is most preferable in terms of availability and cost.

Further, examples of the pigment of the magenta ink include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (Bengal), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and the like, and C.I. Pigment Violet 19, a pigment having a quinacridone skeleton is preferable, and particularly, C.I. Pigment Red 122 is most preferable.

Further, examples of the pigment of the cyan ink include C.I. Pigment Blue 1, 2, 3, 15, 15:1, 15:2, 15:3, 15:34, 16, 17:1, 22, 25, 56, 60, C.I. Vat Blue 4, 60, 63, and the like, particularly, C.I. Pigment Blue 15:3 is preferable.

Each of the pigments may be used alone or in a combination of two or more kinds thereof, and also plural kinds in each group or plural kinds selected from each group may be used in combination thereof.

The content of the pigment in the ink of the present invention is preferably 0.1% by mass to 20% by mass, more preferably 0.2% by mass to 15% by mass, and particularly preferably 0.5% by mass to 10% by mass, with respect to the total solid content mass of the ink, from the viewpoints of ink coloring property, storage stability, and the like.

(Method for Preparing Pigment Dispersion)

According to the present invention, the method for preparing the pigment coated with the specific water-insoluble resin (hereinafter also simply referred to as the "resin-coated pigment") is not particularly limited, but, it can be prepared, for example, by using the specific water-insoluble resin as a dispersant and dispersing the pigment by means of the dispersant, thereby preparing a pigment dispersion.

In this case, the ink of the present invention is prepared, for example, by mixing the pigment dispersion obtained above, the nitrogen-containing organic solvent, resin particles, and water.

By doing this, a pigment particle can be allowed to exist at a fine particle diameter, and thus, after dispersion, high dispersion stability is obtained. In this case, it is not necessary for the entire particle surface of the pigment to be coated with the specific water-insoluble resin, and if desired, at least a part of the particle surface may be coated with the specific water-insoluble resin.

Preparation of the pigment dispersion can be carried out, for example, by a phase inversion emulsion method.

Specifically, it can be carried out by mixing and dispersing the above-mentioned pigment, the above-mentioned specific water-insoluble resin as a dispersant, water, and the water-insoluble volatile solvent to obtain a dispersion, and then removing a part or all of the water-insoluble volatile solvent from the obtained dispersion. Herein, a basic compound may be added thereto to neutralize a part or all of anionic groups of the water-insoluble resin. It is possible to attain good dispersibility by adjusting the neutralization condition. Examples of the basic compound include sodium hydroxide and the like.

Further, herein, an alkylene oxide adduct of glycerin may be added together with the water-insoluble volatile solvent.

The dispersion can be carried out by using a known method in which desired components are mixed and then stirring, dispersing, and the like can be carried out, or by using a mixing and stirring apparatus, a dispersing apparatus, or the like. The dispersion can be carried out, for example, by using a ball mill, a roll mill, a bead mill, a high-pressure homogenizer, a high-speed stirring disperser, an ultrasonic homogenizer, or the like.

—Pigment Dispersant—

During preparation of the pigment dispersion, the above-mentioned specific water-insoluble resin can be used as a dispersant. Herein, other pigment dispersants may be used in combination with the specific water-insoluble resin.

Other pigment dispersants may be suitably selected from the compounds having a function of dispersing a pigment in the aqueous phase. Examples of the pigment dispersant include a nonionic compound, an anionic compound, a cationic compound, an amphoteric compound, and the like.

—Water-Insoluble Volatile Solvent—

During preparing the pigment dispersion, at least one kind of the water-insoluble volatile solvent can be used. Since the water-insoluble volatile solvent has a little effect for dispersibility, it is possible to maintain good dispersibility in the dispersion step, and attain thickening while keeping a good dispersion state by finally removing a part or all of the water-insoluble volatile solvent, and it is also possible to obtain a pigment dispersion which is excellent in long-term storage stability. Further, in the case of preparing an ink composition and using it for recording, image recording can be carried out, in which the ejection stability is excellent and generation of curls is suppressed.

The "water-insoluble" refers to a property in which a mixed solution when mixed with an equivalent volume of pure water at 1 atm and a temperature of 20° C. does not show uniform appearance even after flowing has been stabilized. The solubility in water at 20° C. is preferably 80 g/100 ml or less, and more preferably 50 g/100 ml.

Further, the "volatile" refers that the boiling point is 200° C. or lower. The boiling point is more preferably 150° C. or lower.

The water-insoluble volatile solvent can be selected, if desired, from the organic solvents that are water-insoluble and thus volatile. Specific examples of the water-insoluble volatile solvent include ketone-based solvents (for example, methyl ethyl ketone, diethyl ketone, and the like), ether-based solvents (for example, dibutyl ether, and the like), and the like. Among them, from the viewpoint of providing dispersion stability, the ketone-based solvents are preferable, among which methyl ethyl ketone is most preferable.

The amount of the water-insoluble volatile solvent to be used is preferably 10% by mass to 1000% by mass, more preferably 50% by mass to 800% by mass, and particularly preferably 100% by mass to 500% by mass, with respect to the amount of the alkylene oxide adduct of glycerin to be used, from the standpoint that the dispersibility and stability after the dispersion are good and from the viewpoints of ejection stability and inhibition of the curling in the case of using it for recording as the ink composition.

For the water-insoluble volatile solvent as described above, it is preferable that after the dispersion of the pigment, a part or all of the water-insoluble volatile solvent be removed from the ink. From this, a thickened pigment dispersion can be obtained by reducing finally unwanted water-insoluble volatile solvents while maintaining pigment dispersion and long-term storage stability. In addition, when the water-insoluble volatile solvent is used for the preparation of the pigment ink for recording an image, ejection stability is promoted, and thus, generation of curls after recording can be suppressed.

Removal of the water-insoluble volatile solvent is carried out by an ordinary method such as drying treatments such as heating, blowing air, and the like, distillation under reduced pressure, and the like, and by evaporating the water-insoluble volatile solvent from the dispersion obtained at the dispersion step, the dispersion is thickened and phase-inverted into the aqueous phase. In this case, when the specific water-insoluble resin is used as a pigment dispersant, a dispersion of the resin-coated pigment particles, in which the particle surface of the pigment is coated with the specific water-insoluble resin, can be obtained.

After removing the water-insoluble volatile solvent, it is preferable that the water-insoluble volatile solvent in the prepared pigment dispersion be substantially removed, but the residual amount of the water-insoluble volatile solvent in the pigment dispersion is preferably 5% by mass or less with respect to the mixed amount upon dispersion, from the viewpoints of thickening of the pigment dispersion, ejection stability when an ink composition is formed, and suppression of the curling.

Herein, the residual amount of the water-insoluble volatile solvent in the pigment dispersion is preferably 5 ppm to 400 ppm based on the mass.

Further, the content of the water-insoluble volatile solvent (for example, methyl ethyl ketone) in the ink of the present invention is preferably 1 ppm to 100 ppm, and more preferably 1 ppm to 50 ppm, based on the mass.

The average particle diameter of the resin-coated pigment particles dispersed in the pigment dispersion is preferably in the range of 30 nm to 200 nm, and more preferably in the range of 50 nm to 150 nm. If the particle diameter is 30 nm or more, the preparation aptitude is improved, whereas if the particle diameter is 200 nm or less, the storage stability becomes better. Also, the particle diameter distribution of the resin-coated pigment particle is not particularly limited, and may be any one of a wide particle diameter distribution and monodispersed particle diameter distribution.

Furthermore, the average particle diameter and the particle diameter distribution of the pigment particle is determined by measuring a volume average particle diameter according to a dynamic light scattering method by use of a Nanotrac particle size distribution analyzer UPA-EX150 (trade name, manufactured by Nikkiso Co., Ltd.).

The "pigment coated with the specific water-insoluble resin of the present invention" (resin-coated pigment) is described as above.

The content of "pigment coated with the specific water-insoluble resin of the present invention" in the ink of the present invention ink is not particularly limited, but it is preferably 0.05% by mass to 30% by mass, more preferably 0.1% by mass to 20% by mass, and particularly preferably 0.15% by mass to 15% by mass. If the content is 0.05% by mass or more, the color developing property of the ink can be further improved. Further, if the content is 30% by mass or less, an increase in the viscosity of the ink can be more effectively inhibited, and thus, deterioration of ejection stability of the ink and the like can be more effectively inhibited.

<Nitrogen-Containing Organic Solvent>

The ink of the present invention contains a nitrogen-containing organic solvent. By this, the adhesiveness of the formed image and the recording medium (particularly, the recording medium which is a non-porous substrate as described later) is improved.

The nitrogen-containing organic solvent is preferably a compound including a nitrogen-containing heterocyclic structure.

Examples of the compound including a nitrogen-containing heterocyclic structure include 2-pyrrolidone, N-methyl-2-pyrrolidone, pyridine, and piperidine.

The nitrogen-containing organic solvent in the ink may be of one kind or of two or more kinds thereof.

The content of the nitrogen-containing organic solvent in the ink is not particularly limited, but from the viewpoint of obtaining the effect of the present invention more effectively, it is preferably 10% by mass or more, more preferably 10% by mass to 30% by mass, and particularly preferably 10% by mass to 20% by mass.

<Water-Soluble Organic Solvent>

The ink of the present invention contains at least water, but it preferably further contains a water-soluble organic solvent.

The water-soluble organic solvent is added, for example, as an anti-drying agent, a wetting agent, or a penetration promoting agent. For example, it is added as an anti-drying agent or a wetting agent for the purpose of preventing clogging due to drying of the ink of the present invention at an ink ejection opening of a nozzle.

As the anti-drying agent or the wetting agent, a water-soluble organic solvent having a lower vapor pressure lower than that of water is preferred.

Further, for the purpose of allowing paper to be well penetrated by the inkjet ink, a water-soluble organic solvent is preferably used as a penetration promoting agent.

Examples of the water-soluble organic solvent include glycerin, 1,2,6-hexanetriol, trimethylol propane, ethylene glycol, propylene glycol, diethylene glycol, triethylene glycol, tetraethylene glycol, pentaethylene glycol, dipropylene glycol, alkanediols such as 2-butene-1,4-diol, 2-ethyl-1,3-hexanediol, 2-methyl-2,4-pentanediol, 1,2-octanediol, 1,2-hexanediol, 1,2-pentanediol, 4-methyl-1,2-pentanediol, and the like (polyhydric alcohols); sugars such as glucose, mannose, fructose, ribose, xylose, arabinose, galactose, aldonic acid, glucitol, maltose, cellobiose, lactose, sucrose, trehalose, maltotriose, and the like; sugar alcohols; hyaluronic acids; so-called solid wetting agents such as ureas and the like; alkyl alcohols having 1 to 4 carbon atoms such as ethanol, methanol, butanol, propanol, isopropanol, and the like; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methyoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, and the like; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, sulforane, and the like. Each may be used alone or in a combination of two or more kinds thereof.

As an anti-drying agent or a wetting agent, polyhydric alcohols are useful. Examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol and the like. Each may be used alone or in a combination of two or more kinds thereof.

As a penetration agent, polyol compounds are preferred. Examples of the aliphatic diol include 2-methyl-1,3-propanediol, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, and the like. Among these, preferred examples thereof include 2-methyl-1,3-propanediol, 2-ethyl-1,3-hexanediol, and 2,2,4-trimethyl-1,3-pentanediol.

Each of the water-soluble organic solvents that is used in the present invention may be used alone or in a combination of two or more kinds thereof.

The content of the water-soluble organic solvent in the ink of the present invention is preferably 1% by mass to 30% by mass, more preferably 1% by mass to 20% by mass, and particularly preferably 1% by mass to 10% by mass.

The addition amount of water in the ink of the present invention ink is not particularly limited, but it is preferably 10% by mass to 99% by mass, more preferably 30% by mass to 80% by mass, and even more preferably 30% by mass to 70% by mass.

If the content of water or the water-soluble organic solvent is within the above-described range, the liquid physical properties such as the drying speed of the ink, the penetrating property to an adhered body, the viscosity, and the like can be adjusted to appropriate states.

<Resin Particles>

The ink of the present invention contains at least one kind of the resin particle.

In this regard, the adhesiveness (fixability) of the image onto the recording medium (particularly, the recording medium which is a porous substrate as described later), the durability of the image, or the like is improved.

Examples of the resin particles include acryl-based resins, vinyl acetate-based resins, styrene-butadiene-based resins, vinyl chloride-based resins, acryl-styrene-based resins, butadiene-based resins, styrene-based resins, crosslinked acryl-based resins, crosslinked styrene-based resins, benzoguanamine-based resins, phenol-based resins, silicone-based resins, epoxy-based resins, urethane-based resins, paraffin-based resins, fluorine-based resins, and the like.

Among them, preferable examples thereof include acryl-based resins, acryl-styrene-based resins, styrene-based resins, crosslinked acrylic resins, and crosslinked styrene-based resins.

The weight-average molecular weight of the resin particle is preferably 10000 to 200000, and more preferably 100000 to 200000.

The average particle diameter of the resin particle is preferably in the range of 10 nm to 1 μm, more preferably in the range of 10 nm to 200 nm, even more preferably in the range of 20 nm to 100 nm, and particularly preferably in the range of 20 nm to 50 nm.

The glass transition temperature Tg of the resin particle preferably 30° C. or higher, more preferably 40° C. or higher, and even more preferably 50° C. or higher.

The addition amount of the resin particles is preferably 0.5 by mass to 20% by mass, more preferably 3 by mass to 20% by mass, and even more preferably 5 by mass to 15% by mass with respect to the ink.

Further, the particle diameter distribution of the polymer particle is not particularly limited, and one having any of a wide particle diameter distribution, a monodispersed particle diameter distribution, or others may be available. Further, two or more kinds of the polymer particle having a monodispersed particle diameter distribution may be mixed and used.

Further, the resin particle is preferably contained in the ink of the present invention in the form of a latex in which the resin particles are dispersed in an aqueous medium (hereinafter also referred to as a "resin particle dispersion" or a "polymer colloid").

By incorporating the latex into the ink of the present invention, the fixability of the image onto the recording medium (particularly, a porous substrate to be described) is further improved. That is, if the ink containing the latex is used to form an image, a hydrophobic film is formed on the recording medium having the image formed thereon, and the pigment is trapped in the film or an underlayer thereof and protected.

Herein, the aqueous medium refers to water, and a hydrophilic organic solvent which is used, optionally.

Further, the latex encompasses a latex prepared by dispersing resin particles in an aqueous medium, and a latex prepared by using a monomer emulsion including at least one monomer for forming resin particles by homopolymerization or copolymerization. Examples of the monomer obtained by using the latex include styrene, alkyl(meth)acrylate having 1 to 8 carbon atoms, ethylene glycol(meth)acrylate, ethylene glycol(meth)acrylate, ethylene glycol(meth)acrylate, (meth)acrylic acid, and the like.

~Self-Dispersing Polymer~

As a resin particle of the present invention, self-dispersing polymers as described in, for example, Paragraphs 0013 to 0038 of JP-A No. 2009-190232 or Paragraphs 0016 to 0128 of JP-A No. 2009-013394 may be used.

The self-dispersing polymer refers to a water-insoluble polymer which can be in the dispersed state in an aqueous medium by a functional group of the polymer itself (particularly, a cationic group, an anionic group, or a salt thereof) in the absence of a surfactant. Herein, the dispersed state encompasses both an emulsified state in which water-insoluble polymers are dispersed in the liquid state in the aqueous medium (emulsion), and a dispersed state in which water-insoluble polymers are dispersed in the solid state in the aqueous medium (suspension).

The self-dispersing polymer is preferably a self-dispersing polymer which allows the water-insoluble polymers are dispersed in the solid state, resulting in the dispersed state, from the viewpoint of, for example, the ink fixability when it is contained in the ink.

Examples of a method for preparing the emulsified or dispersed state of the self-dispersing polymers, that is, an aqueous dispersion of the self-dispersing polymers include a method in which the self-dispersing polymers are dissolved or dispersed in a solvent (for example, a water-soluble organic solvent and the like), and then introduced to water as it is without addition of a surfactant, a salt-forming group (for example, an anionic group) having the self-dispersing polymer is stirred and mixed in the neutralized state, and the solvent is removed, thereby obtaining an aqueous dispersion in the emulsified or dispersed state.

Furthermore, the emulsified or dispersed state regarding the self-dispersing polymer represents a state such that the presence of an emulsified or dispersion state can be visually confirmed with stability over at least one week at 25° C. in a state obtained by mixing a solution obtained by dissolving 30 g of a water-insoluble polymer in 70 g of an organic solvent (for example, methyl ethyl ketone), a neutralizing agent capable of 100% neutralization of salt-forming groups of the water-insoluble polymer (where the salt-forming group is anionic, the neutralizing agent is sodium hydroxide, and where the salt-forming group is cationic, the neutralizing agent is acetic acid), and 200 g of water, stirring (apparatus: stirring apparatus equipped with a stirring impeller, revolution speed 200 rpm, 30 min., 25° C.), and then removing the organic solvent from the mixed liquid.

Moreover, the water-insoluble polymer as referred to herein is a polymer that is dissolved in an amount of 10 g or less when dried for 2 hours at 105° C. and then dissolved in 100 g of water at 25° C. The amount dissolved is preferably 5 g or less, and more preferably 1 g or less. The amount dissolved refers to a state upon 100% neutralization with sodium hydroxide or acetic acid, correspondingly to the type of the salt-forming group of the water-insoluble polymer.

A main chain skeleton of the water-insoluble polymer is not particularly limited, and a vinyl polymer or a condensation polymer (an epoxy resin, a polyester, a polyurethane, a polyamide, cellulose, a polyether, a polyurea, a polyimide, a polycarbonate, and the like) can be used. Among them, a vinyl polymer is preferred.

Preferred examples of the vinyl polymer and the monomers constituting vinyl polymer include those described in JP-A Nos. 2001-181549 and 2002-088294. Further, a vinyl polymer having a dissociative group introduced into the end of the polymer chain by radical polymerization of a vinyl monomer using a chain transfer agent, a polymerization initiator, or an iniferter having a dissociative group (or a substituent that can derive a dissociative group) or by ion polymerization using a compound having a dissociative group (or a substituent that can derive a dissociative group) for either an initiator or a stopping agent can be also used.

Also, preferred examples of the condensation polymer and the monomers constituting the condensation polymer include those described in JP-A No. 20001-247787.

From the viewpoint of self-dispersibility, it is preferable that the self-dispersing polymer particle of the present invention preferably include the water-insoluble polymers containing a hydrophilic structural unit and a structural unit derived from a monomer containing an aromatic group.

The hydrophilic structural unit is not particularly limited, provided that it is derived from a monomer containing a hydrophilic group, and this structural unit may be derived from one monomer containing a hydrophilic group or two or more monomers containing a hydrophilic group. The hydrophilic group is not particularly limited, and may be a dissociative group or a nonionic hydrophilic group.

According to the present invention, from the viewpoint of promoting the self dispersion and of stability of the emulsion or dispersion state that has been formed, it is preferred that the hydrophilic group be a dissociative group, and more preferably an anionic dissociative group. Examples of dissociative groups include a carboxy group, a phosphoric acid group, a sulfonic acid group, and the like. Among them, from the viewpoint of fixability when the ink composition is configured, a carboxy group is preferred.

From the viewpoints of self-dispersibility and coagulation ability, it is preferred that the monomer containing a hydrophilic group according to the present invention be a monomer containing a dissociative group, more preferably a monomer containing a dissociative group, which has a dissociative group and an ethylenic unsaturated bond.

Examples of the monomers containing a dissociative group include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomer include styrenesulfonic acid, 2-acrylamido-2-methylpropanesulfonic acid, 3-sulfopropyl(meth)acrylate, bis-(3-sulfopropyl)-itaconic acid esters, and the like. Specific examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate, and the like.

Among the monomers containing a dissociative group, from the viewpoints of dispersion stability and ejection stability, an unsaturated carboxylic acid monomer is preferred, and an acrylic acid and a methacrylic acid are more preferred.

From the viewpoints of the self-dispersibility and the coagulation speed during contact with a reaction liquid, it is preferred that the self-dispersing polymer particles according to the present invention include a first polymer having a carboxy group and an acid value (mg KOH/g) of 25 to 100. Furthermore, from the viewpoints of the self-dispersibility and the coagulation speed during contact with a reaction liquid, the acid value is more preferably 25 to 80, and particularly preferably 30 to 65.

If the acid value is 25 or more, good stability of self-dispersibility is obtained. If the acid value is 100 or less, coagulation ability is improved.

The monomer containing an aromatic groups is not particularly limited, provided that it is a compound having an aromatic group and a polymerizable group. The aromatic group may be a group derived from an aromatic hydrocarbon or a group derived from an aromatic hetero ring. According to the present invention, from the viewpoint of particle shape stability in the aqueous medium, it is preferred that the aromatic group be derived from an aromatic hydrocarbon.

In addition, the polymerizable group may be a condensation polymerizable group or an addition polymerizable group. According to the present invention, from the viewpoint of particle shape stability in the aqueous medium, the polymerizable group is preferably an addition polymerizable group, and more preferably a group including an ethylenically unsaturated bond.

The monomer containing an aromatic group according to the present invention is preferably a monomer having an aromatic group derived from an aromatic hydrocarbon and an ethylenically unsaturated bond, and more preferably a (meth)acrylate monomer containing an aromatic group.

According to the present invention, each of the monomers containing an aromatic group may be used alone or in a combination of two or more kinds thereof.

Examples of the monomer containing an aromatic group include phenoxyethyl(meth)acrylate, benzyl(meth)acrylate, phenyl(meth)acrylate, a styrene monomer, and the like. Among them, from the viewpoints of hydrophilic-hydrophobic balance of the polymer chain and ink fixability, the monomer containing an aromatic group is preferably at least one selected from phenoxyethyl(meth)acrylate, benzyl(meth)acrylate, and phenyl(meth)acrylate, more preferably phenoxyethyl(meth)acrylate, and particularly preferably phenoxyethyl acrylate.

The self-dispersing polymer particles of the present invention include a structural unit derived from a (meth)acrylate monomer containing an aromatic group, and the content thereof is preferably 10% by mass to 95% by mass. If the content ratio of the (meth)acrylate monomer containing an aromatic group is 10% by mass to 95% by mass, the stability of self-emulsion or dispersion state is improved. In addition, the increase in ink viscosity can be inhibited.

According to the present invention, from the viewpoint of stability of the self-dispersion state, stabilization of the particle shape in an aqueous medium by hydrophobic interaction of aromatic rings with each other, and decrease in the amount of the water-soluble components caused by appropriate hydrophobization of the particles, the content ratio of the (meth)acrylate monomer containing an aromatic group is preferably 15% by mass to 90% by mass, more preferably 15% by mass to 80% by mass, and particularly preferably 25% by mass to 70% by mass.

The self-dispersing polymer particles of the present invention can be configured, for example, by a structural unit including a monomer containing an aromatic group and a structural unit including a monomer containing a dissociative group. If necessary, the particles may also include other structural units.

The monomers forming other structural units are not particularly limited, provided that they are monomers copolymerizable with the monomer containing an aromatic group and the monomer containing a dissociative group. Among them, from the viewpoints of flexibility of the polymer skeleton and easiness of controlling the glass transition temperature (Tg), a monomer containing an alkyl group is preferred.

Examples of the monomer containing an alkyl group include alkyl(meth)acrylates such as methyl(meth)acrylate, ethyl(meth)acrylate, isopropyl(meth)acrylate, n-propyl (meth)acrylate, n-butyl(meth)acrylate, isobutyl(meth)acrylate, t-butyl(meth)acrylate, hexyl(meth)acrylate, ethylhexyl (meth)acrylate, and the like; ethylenically unsaturated monomers having a hydroxyl group, such as hydroxymethyl (meth)acrylate, 2-hydroxyethyl(meth)acrylate, 2-hydroxy propyl(meth)acrylate, 4-hydroxy butyl(meth)acrylate, hydroxypentyl(meth)acrylate, hydroxyhexyl(meth)acrylate, and the like; dialkylaminoalkyl(meth)acrylates such as dimethylaminoethyl(meth)acrylate and the like; N-hydroxyalkyl (meth)acrylamides such as N-hydroxymethyl(meth)acrylamide, N-hydroxyethyl(meth)acrylamide, N-hydroxybutyl (meth)acrylamide, and the like; and (meth)acrylamides including N-alkoxyalkyl(meth)acrylamides such as N-methoxymethyl(meth)acrylamide, N-ethoxymethylacrylamide (meth), N-(n-, iso)butoxymethyl(meth)acrylamide, N-methoxyethylacrylamide(meth), N-ethoxyethyl(meth) acrylamide,N-(n-, iso)butoxyethylaryl amide(meth), and the like.

The molecular weight range of the water-insoluble polymer constituting the self-dispersing polymer particles of the present invention is preferably 3000 to 200000, more preferably 5000 to 150000, and even more preferably 10000 to 100000, in terms of a weight-average molecular weight. If the weight-average molecular weight is 3000 or more, the amount of water-soluble components can be effectively suppressed. If the weight-average molecular weight is 200000 or less, self-dispersion stability can be increased.

Further, the weight-average molecular weight can be measured by gel permeation chromatography (GPC).

From the viewpoint of controlling the hydrophilicity of the polymer, it is preferable that the water-insoluble polymer constituting the self-dispersing polymer particles of the present invention include a (meth)acrylate monomer containing an aromatic group at a copolymerization ratio of 15% by mass to 90% by mass, a monomer containing a carboxy group, and a monomer containing an alkyl group, have an acid value of 25 to 100, and have a weight-average molecular weight of 3000 to 200000. It is more preferable that the water-insoluble polymer constituting the self-dispersing polymer particles include a (meth)acrylate monomer containing an aromatic group at a copolymerization ratio of 15 to 80% by mass, a monomer containing a carboxy group, and a monomer containing an alkyl group, have an acid value of 25 to 95, and have a weight-average molecular weight of 5000 to 150000.

<Surfactant>

The ink of the present invention preferably contains at least one kind of the surfactant.

As a surfactant, an acetylene glycol-based surfactant represented by the following formula (11) (for example, OLFINEY, E1010, and STG, and SURFYNOL 82, 104, 440, 465, and 485 (trade name, manufactured by Nissin Chemical Industry Co., Ltd.), and the like), or a polysiloxane-based compound represented by the following formula (12) (for example, silicone-based surfactants BYK-345, BYK-346, BYK-347, or BYK-348, trade name, available from BYK Japan KK) can be used. Besides, an anionic surfactant (for example, sodium dodecylbenzene sulfonate, sodium laurate, ammonium salts of polyoxyethylene alkylether sulfate, and the like), nonionic surfactants (for example, polyoxyethylene alkylether, polyoxyethylene alkyl ester, polyoxyethylene sorbitan fatty acid ester, polyoxyethylene alkylphenyl ether, polyoxyethylene alkylamine, polyoxyethylene alkylamide, and the like), and the like.

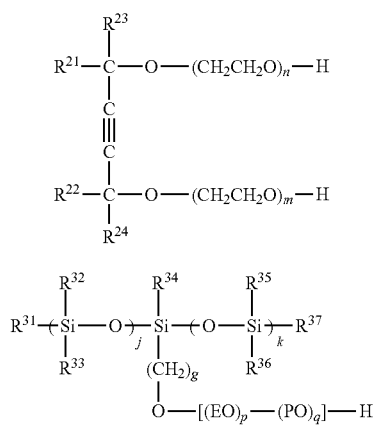

In the formula (11), $0 \leq m+n \leq 50$, and $R^{21}$ to $R^{24}$ each independently represent an alkyl group having 1 to 6 carbon atoms.

In the formula (12), $R^{31}$ to $R^{37}$ each independently represent an alkyl group having 1 to 6 carbon atoms, j, k, and g each independently an integer of 1 or more, EO is an ethyleneoxy group, PO is a propyleneoxy group, p and q are integers of 0 or more, but p+q is an integer of 1 or more, and EO and PO have an arrangement in any order in [ ] and may be of a random or block type.

Each of these surfactants may be used alone or in a combination of two or more kinds thereof.

The blending amount of the surfactant in the ink of the present invention is preferably 0.01% by mass to 10% by mass, and more preferably 0.1% by mass to 5% by mass.

<Other Additives>

The ink of the present invention can contain other additives, optionally, in addition to the components.

Examples of the other additives of the present invention include known additives such as a solid wetting agents (for example, urea or a derivative thereof, sugars, sugar alcohols, hyaluronic acids, polyhydric alcohols, and the like), thickeners (for example, polyvinyl alcohol, polyvinyl pyrrolidone, polyoxyalkylene glycols, and the like), an anti-fading agent, an emulsion stabilizer, an ultraviolet absorbent, a preservative, an anti-mold agent, a pH adjusting agent, a surface tension adjusting agent, an antifoaming agent, a viscosity adjusting agent, a dispersion stabilizer, an anticorrosive agent, a chelating agent, and the like. These various additives may be directly added after the preparation of the ink of the present invention, or added during the preparation of the ink of the present invention. Specifically, examples of the other additives include other additives described in Paragraphs [0153] to [0162] of JP-A No. 2007-100071, and the like.

The surface tension of the ink of the present invention is preferably 40 mN/m or less, and more preferably 28 to 35 mN/m, from the viewpoints of propagation of the dots on the recording medium, prevention of color bleeding, drying property, and the like.

The surface tension of the ink can be measured, for example, by means of a measurement apparatus such as a Face automatic surface tensiometer "CBVP-Z" [trade name, manufactured by Kyowa Interface Science Co., Ltd.], and the like.

The viscosity of the ink of the present invention is preferably in the range of 1 mPa·s to 30 mPa·s, more preferably in the range of 1 mPa·s to 20 mPa·s, even more preferably in the range of 2 mPa·s to 15 mPa·s, and particularly preferably in the range of 2 mPa·s to 10 mPa·s, from the viewpoints of droplet ejection stability and coagulation speed.

The viscosity of the ink can be measured, for example, by using a Brookfield viscometer at 20° C.

The pH of the ink of the present invention is preferably pH 7.5 to 10, and more preferably pH 8 to 9, from the viewpoint of stability as a composition. Further, the pH of the ink composition is measured by means of a pH measurement apparatus (for example, Multi-Parameter Meter MM-60R, manufactured by DKK-TOA Corp.), as usually used at 25° C.

Furthermore, the pH of the ink can be appropriately prepared by using an acidic compound or a basic compound. As the acidic compound or the basic compound, ordinarily used compounds can be used without particular limitation.

<<Image Forming Method>>

The image forming method of the present invention includes a step of applying the ink of the present invention to a recording medium.

By the image forming method of the present invention, the image defect (particularly, the image defect when the ink after storage) is inhibited.

Further, the image formed by the image forming method of the present invention is excellent in adhesiveness with the recording medium as well as durability (for example, scratch resistance).

As a recording medium, a porous substrate may be used or a non-porous substrate may also be used.

Among them, from the viewpoint of more effective exhibition of the characteristics of the ink of the present invention, a non-porous substrate is preferable.

That is, generally, there is a tendency that when an image is formed on a non-porous substrate, the adhesiveness of the image is deteriorated, as compared to a case where an image is formed on a porous substrate. In this regard, it is possible to inhibit the image defect with maintenance of the adhesiveness of the image by applying the ink of the present invention to the non-porous substrate to form an image.

Examples of the porous substrate include plain paper, resin-coated paper, for example, paper for an inkjet printer as described in JP-A Nos. 8-169172, 8-27693, 2-276670, 7-276789, 9-323475, 62-238783, 10-153989, 10-217473, 10-235995, 10-217597, 10-337947, and the like, paper for electrophotography, cloth, and the like.

Examples of the non-porous substrate include a plastic sheet substrate, a plastic film substrate, a metal substrate, a glass substrate, a plastic coated paper, and the like. Among them, a plastic sheet substrate, a plastic film substrate, a metal substrate, and a glass substrate are preferable.

Examples of the material for the plastic sheet or the plastic film include synthetic resins, such as polyesters (for example, polyvinyl chloride, polyethylene terephthalate (PET), polybutylene terephthalate, polyethylene naphthalene (PEN), and the like), polycarbonate (polycarbonate), polyarylate, triacetylcellulose (TAC), and the like.

The image forming method of the present invention is configured to include, for example, a step of discharging the ink of the present invention to a recording medium to form an image, and optionally, other steps.

<Ink Ejection Step>

In the ink ejection step, the above-described ink of the present invention is applied to the recording medium by an inkjet method.

In the present step, the ink composition can be selective applied to the recording medium to form a visible image. Details of the detailed and exemplary embodiments, and the like of the respective component of the ink of the present invention are as described above.

In addition, as a method for inkjet recording preferred for the invention, those disclosed in Paragraphs 0093 to 0105 of JP-A No. 2003-306623 can be applied.

The inkjet method is not particularly limited, and may use any one of a charge controlling system of ejecting an ink using electrostatic attraction, a drop on demand system (pressure pulse system) using an oscillating pressure of piezo elements, an acoustic inkjet system of ejecting an ink using the radiation pressure of the ink caused by an acoustic beam converted from an electric signal, a system employing a thermal inkjet print head using a pressure generated by bubbles formed by heating an ink, and the like.

Among those, from the viewpoint of effectively exhibiting the characteristics of the ink of the present invention, a system using a thermal inkjet print head is preferable.

That is, the system using a thermal inkjet print head is required to have higher ink characteristics, as compared to other systems, and accordingly, the effect of inhibition of image defect by the ink of the present invention or improvement of adhesiveness is more effectively exhibited on the system using a thermal inkjet print head.

Further, examples of the inkjet method include a system of ejecting a number of ink droplets of low concentration, a so-called photo-ink, in a small volume, a system of improving an image quality by using plural kinds of inks of a substantially identical hue and of different densities, and a system of using a colorless transparent ink.

<Fixing Step>

The image recording method of the present invention preferably further includes a fixing step in which the recording medium having the image applied thereto is heated to fix the image after the step of applying the ink.

By carrying out the treatment in the fixing step, the scratch resistance of the image can be further improved.

At the fixing step, the image is preferably fixed by at least heating, and the image is more preferably fixed by heating and pressurizing (hereinafter also referred to as "heating and pressurizing").

The image fixing by heating can be carried out, for example, by bringing the heating surface into contact with the image formed on the recording medium.

The heating is preferably carried out at a temperature of the minimum film formation temperature (MFT) of the polymer particles in the image or higher. By heating to MFT or higher, the polymer particles are coated, whereby the image is reinforced. The heating temperature is preferably in the temperature zone of the MFT or higher. Specifically, the heating temperature is preferably in the range of 40° C. to 80° C., more preferably in the range of 50° C. to 75° C., and even more preferably in the range of 55° C. to 70° C.

The minimum film formation temperature (MFT) of the polymer particles is controlled by the Tg of the polymer, and the kind and amount of the ink solvent. Thus, generally there is a tendency that as the Tg is lower, the I/O value of the ink solvent is lower, and the amount of the ink solvent is higher, MFT is lowered.

The pressure upon pressurizing in combination with heating is preferably in the range of 0.1 MPa to 3.0 MPa, more preferably in the range of 0.1 MPa to 1.0 MPa, and even more preferably in the range of 0.1 MPa to 0.5 MPa in terms of obtaining a flattened surface.

The method of heating is not particularly limited, but examples thereof include a method of heating with a heating member such as a nichrome wire heater and the like, a method of supplying warm air or hot air, a method of heating with a halogen lamp, an infrared lamp, or the like, and a method of drying in a non-contact mode.

Further, the method of heating and pressurizing is not particularly limited, but the methods of heating and fixing in a contact mode, such as a method of pressing a hot plate to an image forming surface of a recording medium, or a method of using a heating and pressurizing device having a pair of heating and pressurizing rollers, a pair of heating and pressurizing belts, or a heating and pressurizing belt disposed on the side of an image recording surface of a recording medium and a retaining roller disposed on the side opposite thereto and passing the medium between paired rollers, and the like are preferable.

In the case of heating and pressurizing, the nip is preferably 1 msec to 10 sec, more preferably 2 msec to 1 sec, and even more preferably 4 msec to 100 msec. Further, the nip width is preferably 0.1 mm to 100 mm, more preferably 0.5 mm to 50 mm, and even more preferably 1 mm to 10 mm.

The heating and pressurizing roller may be either a metal roller made of a metal, or a roller having a core metal made of a metal and a cover layer including an elastic member, and optionally, a surface layer (also referred to a releasing layer) provided at the periphery thereof. The latter core metal can be formed, for example, of a cylindrical member made of iron, aluminum, SUS, or the like and the surface of the core metal is preferably covered at least partially with a cover layer. Particularly, the cover layer is formed preferably of a silicone resin or a fluoro-resin having releasability. Further, a heating member preferably is incorporated to the inside of the core metal for one of the heating and pressurizing rollers, and the recording medium may be heated by applying the heating treatment and the pressurizing treatment simultaneously by passing the medium between the rollers, or optionally, by sandwiching the recording medium using two heating rollers. As the heating member, for example, a halogen lamp heater, a ceramic heater, a nichrome wire, or the like is preferred.

As a belt substrate which is used in the heating and pressurizing belt used for the heating and pressurizing device, a seamless electrocast nickel substrate is preferred and the thickness of the substrate is preferably from 10 to 100 μm. Further, for the material of the belt substrate, aluminum, iron, polyethylene, or the like can be used, as well as nickel. In a case of disposing a silicone resin or a fluoro resin, the thickness of the layer formed by using such a resin is preferably 1 μm to 50 μm, and more preferably 10 μm to 30 μm.

Moreover, the pressure (nip pressure) may be attained, for example, by selecting an elastic member such as a spring and the like having tension and disposing the elastic member on both roller ends of the heating and pressurizing rollers such that a desired nip is obtained taking the nip gap into consideration.

The transporting speed of the recording medium in a case of using the heating and pressurizing roller or the heating and pressurizing belt is preferably in a range of 200 mm/sec to 700 mm/sec, more preferably 300 mm/sec to 650 mm/sec, and even preferably 400 mm/sec to 600 mm/sec.

EXAMPLES

Hereinbelow, the present invention will be described in more detail with reference to the following Examples. However, the invention is not intended to be limited to the following Examples. In addition, unless specifically mentioned otherwise, the term "part" and "%" are based on the mass.

In addition, the number-average molecular weight and the weight-average molecular weight were measured by gel permeation chromatography (GPC). For GPC, HLC-8020GPC (trade name, manufactured by Tosoh Corp.) was used and three columns of TSKgel, Super Multipore HZ-H (trade name, manufactured by Tosoh Corp., 4.6 mm ID×15 cm) were used. The detection was carried out using THF (tetrahydrofuran) as an eluent. Further, the detection was carried out under the conditions where the sample concentration was 0.45% by mass, the flow rate was 0.35 ml/min, and the sample injection amount was 10 μl, and the measurement temperature was 40° C., and an RI detector was used for detection. In addition, a calibration curve was established by using eight samples of "Standard Sample TSK standard, polystyrene", manufactured by Tosoh Corp.: "F-40", "F-20", "F-4", "F-1", "A-5000", "A-2500", "A-1000", and "n-propylbenzene".

Synthesis Example 1

Synthesis of Resin Dispersant P-1 (Specific Water-Insoluble Resin)

To a 1000-ml three-neck flask equipped with a stirrer and a condenser, 88 g of methyl ethyl ketone was added, and then heated to 72° C. under a nitrogen atmosphere. To this flask, a solution in which 0.85 g of dimethyl-2,2'-azobisisobutyrate, 50 g of phenoxyethyl methacrylate, 13 g of methacrylic acid, and 37 g of methyl methacrylate were dissolved in 50 g of methyl ethyl ketone was added dropwise over 3 hours. After completion of the dropwise addition, the content in the flask was allowed to react for an additional one hour, and then, a solution in which 0.42 g of dimethyl-2,2'-azobisisobutyrate was dissolved in 2 g of methylethyl ketone was added thereto, the temperature of the mixture was raised to 78° C., and the mixture was heated for 4 hours. The resulting reaction solution was subjected to re-precipitation twice with an excess amount of hexane, and the precipitated resin was dried and 96.5 g of phenoxyethyl methacrylate/methyl methacrylate/methacrylic acid (copolymerization ratio [% by mass ratio]=67/20/13) copolymer (resin dispersant P-1) was obtained.

The composition of the obtained resin dispersant P-1 was confirmed with $^1$H-NMR. The weight-average molecular weight (Mw) of the resin dispersant P-1 as determined by GPC was 49400. Further, the acid value of the resin dispersant P-1 as determined by the method described in JIS Standard (JIS K 0070:1992) was 84.8 mg KOH/g.

Synthesis Example 2

Synthesis of Resin Dispersant P-2 (Specific Water-Insoluble Resin)

A benzyl methacrylate/methacrylic acid (copolymerization ratio [% by mass ratio]=92/8) copolymer (resin dispersant P-2) was obtained in the same manner as the synthesis of a resin dispersant P-1, except that the kind and amount of the monomer were changed.

The composition of the obtained resin dispersant P-2 was confirmed with $^1$H-NMR. Further, the weight-average molecular weight (Mw) of the resin dispersant P-2 as determined by GPC was 45300. Further, the acid value of the resin dispersant P-2 as determined by the method described in JIS Standard (JIS K 0070:1992) was 52.2 mg KOH/g.

Synthesis Example 3

Synthesis of Resin Dispersant P-3 (Specific Water-Insoluble Resin)

A benzyl methacrylate/methacrylic acid/styrene macromer (copolymerization ratio [% by mass ratio]=68/7/25) copolymer (resin dispersant P-3) was obtained in the same manner as the synthesis of a resin dispersant P-1, except that the kind and amount of the monomer were changed.

However, as a styrene macromer, AS-6S (trade name), manufactured by Toagosei Co., Ltd. was used.

The composition of the obtained resin dispersant P-3 was confirmed with $^1$H-NMR. Further, the weight-average molecular weight (Mw) of the resin dispersant P-3 as determined by GPC was 52400. Further, the acid value of the resin dispersant P-3 as determined by the method described in JIS Standard (JIS K 0070:1992) was 45.6 mg KOH/g.

Synthesis Example 4

Synthesis of Resin Dispersant P-4

A styrene/acrylic acid (copolymerization ratio [% by mass ratio]=92/8) copolymer (resin dispersant P-4) was obtained in the same manner as the synthesis of a resin dispersant P-1, except that the kind and amount of the monomer were changed.

The composition of the obtained resin dispersant P-4 was confirmed with $^1$H-NMR. Further, the weight-average molecular weight (Mw) of the resin dispersant P-4 as determined by GPC was 52400. Further, the acid value of the resin dispersant P-4 as determined by the method described in JIS Standard (JIS K 0070:1992) was 62.4 mg KOH/g.

Example 1

Preparation of Dispersion of Resin-Coated Pigment Particles 10 parts by a Pigment Blue 15:3 (Phthalocyanine Blue A220, trade name, manufactured by Dainichiseika Color &

Chemicals Mfg. Co., Ltd), 4.5 parts of the resin dispersant P-1 as described above, 18 parts of methyl ethyl ketone (MEK), 4.2 parts of 1 N aqueous NaOH solution, and 63.3 parts of ion exchange water were mixed and dispersed with mixing, and subjected to ten-passage treatment with a disperser (Microfluidizer M-140K, trade name, 150 MPa). Subsequently, methyl ethyl ketone was removed from the obtained dispersion at 55° C. under reduced pressure and a part of water was further removed, thereby obtaining a dispersion of the resin-coated pigment particles with a pigment concentration of 10.2% by mass. At this time, the residual MEK amount was found to be 180 ppm, as measured by means of gas chromatography.

~Measurement of Particle Diameter of Resin-Coated Pigment Particles~

A volume average particle diameter of the obtained resin-coated pigment particles was measured according to a dynamic light scattering method by use of a Nanotrac particle size analyzer UPA-EX150 (trade name, manufactured by Nikkiso Co., Ltd.). Measurement was carried out by adding 10 ml of ion exchange water to 10 μl of the dispersion of the resin-coated pigment particles to prepare a measurement solution, and adjusting the temperature thereof to 25° C. The measurement results are shown in Table 1 below.

<Preparation of Aqueous Dispersion (Latex) of Self-dispersing Polymer Particles>

360.0 g of methyl ethyl ketone was loaded into a 2-liter three-neck flask equipped with a stirrer, a thermometer, a reflux condenser, and a nitrogen gas inlet tube, and the temperature thereof was raised to 75° C. A mixed solution obtained from 180.0 g of phenoxyethyl acrylate, 162.0 g of methyl methacrylate, 18.0 g of acrylic acid, 72 g of methyl ethyl ketone, and 1.44 g of "V-601" (trade name, manufactured by Wako Junyaku) was dropwise added thereto at a constant rate so that the dropwise addition was completed within 2 hours, while maintaining the temperature inside the reaction container at 75° C. After the completion of dropping, a solution obtained from 0.72 g of "V-601" and 36.0 g of methyl ethyl ketone was added thereto, followed by stirring at 75° C. for 2 hours. Then, a solution including 0.72 g of "V-601" and 36.0 g of isopropanol was added thereto, followed by stirring at 75° C. for 2 hours, then raising the temperature thereof to 85° C., and further stirring for 2 hours. The weight-average molecular weight (Mw) of the copolymer obtained (in which the weight-average molecular weight was 64000 (as calculated in terms of polystyrene by means of gel permeation chromatography (GPC) and the columns used were TSKgel SuperHZM-H, TSKgel SuperHZ4000, TSKgel SuperHZ200 (trade name, all manufactured by Tosoh Corp.), and the acid value was 38.9 (mg KOH/g).

Next, 668.3 g of the polymerization solution was weighed, 388.3 g of isopropanol and 145.7 ml of a 1 mol/L aqueous NaOH solution were added thereto, and the temperature inside the reaction container was raised to 80° C. Then, 720.1 g of distilled water was added dropwise thereto at a rate of 20 ml/min, thereby obtaining an aqueous dispersion. Thereafter, the temperature inside the reaction container was maintained for 2 hours at 80° C., for 2 hours at 85° C., and for 2 hours at 90° C. under atmospheric pressure, and the pressure inside the reaction container was then reduced to evaporate a total of 913.7 g of isopropanol, methyl ethyl ketone, and distilled water, thereby obtaining an aqueous dispersion (latex) of the self-dispersing polymer particles (resin particles) with a concentration of the solid contents of 28.0%.

The volume average particle diameter of the self-dispersing polymers was 32 nm, as measured by a method such as a method for measuring the volume average particle diameter of the resin-coated pigment particles.

<Preparation of Aqueous Ink>

Next, an aqueous ink 1 was prepared with the following composition (100 parts in total), using the dispersion of the obtained resin-coated pigment particles. The pH of the aqueous ink 1 at 25° C. was 8.9. Further, the aqueous ink 1 was left at 40° C. for a period of 3 months.

The MEK amount in the aqueous ink 1 was 45 ppm as measured with gas chromatography.

| ~ Composition (100 parts in total) ~ | |
|---|---|
| Dispersion of resin-coated pigment particles | 23.0 parts |
| Self-dispersing polymer particles (resin particles) | 6 parts |
| 2-Pyrrolidone (nitrogen-containing organic solvent) | 14 parts |
| 2-Methyl-1,3-propanediol | 5 parts |
| OLFINE E1010 (trade name, manufactured by Nisshin Chemical Industry Co., Ltd. | 1 part |
| Ion exchange water | balance |

<<Image Formation and Evaluation>>

An inkjet apparatus equipped with a prototype print head (thermal system) with 600 dpi and 256 nozzles was prepared as an inkjet recording apparatus, and the aqueous ink 1 obtained above was charged thereinto. By the following method, the image defect and the adhesiveness of the image were evaluated.

The evaluation results are shown in Table 1 below.

<Evaluation of Image Defect>

As a recording medium, Flexcon Busmark vinyl was fixed on a stage which can be moved in a predetermined linear direction at 500 mm/sec, and then a solid image was type-printed on a prototype print head. Immediately after the type-printing, the image was dried at 60° C. for 3 seconds, and passed through a pair of fixing rollers which had been heated to 60° C. Then, the image was subjected to a fixing treatment at a nip pressure of 0.25 MPa and a nip width of 4 mm, thereby obtaining an evaluation sample. In addition, the fixing roller was constituted with a heating roller in which the surface of a cylindrical member made of SUS equipped with a halogen lamp therein was coated with a silicone resin, and a counter roll pressing the heating roller.

The image (5 cm×5 cm) of the evaluation sample was observed. Further, the observed image was visually evaluated in accordance with the following evaluation criteria.

~Evaluation Criteria~

A: Generation of image defect was not observed.

B: Generation of image defect was observed at 2 or less positions.

C: Generation of image defect was observed at 3 to 10 positions.

D: Generation of image defect was observed at more than 10 positions.

<Evaluation of Adhesiveness of Image>

The evaluation sample was prepared in the same manner as for evaluation of image defect, the image in the evaluation sample was evaluated on the adhesiveness of the image in accordance with the following evaluation criteria.

~Evaluation Criteria~

A: There was no ink peeling-off when a tape was adhered and peeled.

B: There was slight ink peeling-off when a tape was adhered and peeled, but there was no problem in terms of practical application.

C: There was ink peeling-off when a tape was adhered and peeled, and there was a problem in terms of practical application.

Examples 2 to 7 and Comparative Examples 1 to 3

Aqueous inks 2 to 10 were each prepared with the changes in the kind of the dispersant, the amount of the self-dispersing polymer particles, and the kind and amount of the nitrogen-containing organic solvent with respect to the aqueous ink 1 of Example 1 as shown in Table 1, and image formation and evaluation were carried out using each of the prepared aqueous inks 2 to 10 as in Example 1. The evaluation results are shown in Table 1 below.

TABLE 1

| | | | | Ink composition | | | | |
| | Ink No. | Resin Dispersant | Particle diameter of resin-coated pigment (nm) | Nitrogen-containing organic solvent (A) | Resin particles (B) | Mass ratio [A/B] | Evaluation of image defect | Evaluation of image adhesiveness |
| --- | --- | --- | --- | --- | --- | --- | --- | --- |
| Example 1 | 1 | P-1 | 93 | 2-Pyrrolidone 14 parts | 6 parts | 2.3 | B | A |
| Example 2 | 2 | P-1 | 93 | 2-Pyrrolidone 14 parts | 4 parts | 3.5 | A | A |
| Example 3 | 3 | P-2 | 95 | 2-Pyrrolidone 12 parts | 5 parts | 2.4 | B | B |
| Example 4 | 4 | P-2 | 95 | 2-Pyrrolidone 18 parts | 5 parts | 3.6 | A | A |
| Example 5 | 5 | P-2 | 95 | 2-Pyrrolidone 18 parts | 4 parts | 4.5 | A | A |
| Example 6 | 6 | P-2 | 95 | 2-Pyrrolidone 22 parts | 4 parts | 5.5 | B | A |
| Example 7 | 7 | P-3 | 92 | 2-Pyrrolidone 18 parts | 5 parts | 3.6 | A | A |
| Comparative Example 1 | 8 | P-2 | 95 | 2-Pyrrolidone 12 parts | 8 parts | 1.5 | C | B |
| Comparative Example 2 | 9 | P-2 | 95 | 2-Pyrrolidone 28 parts | 4 parts | 7.0 | C | A |
| Comparative Example 3 | 10 | P-4 | 94 | 2-Pyrrolidone 18 parts | 5 parts | 3.6 | C | A |

As shown in Table 1, in Examples 1 to 7 in which a pigment coated with a water-insoluble resin, a nitrogen-containing organic solvent, resin particles, and water were contained, and the mass ratio of the nitrogen-containing organic solvent to the resin particles [nitrogen-containing organic solvent/resin particles] was 2.0 to 6.0, the image defect was inhibited. Also, the adhesiveness of the image onto the recording medium was good.

In addition to Examples above, description was made with a focus on a case where a cyan color ink was prepared as an aqueous ink, but aqueous ink with various colors, such as a black ink, a magenta ink, a yellow ink, and the like can be made with modifications of the kind (color) of the pigment used in the cyan color ink, and the same results and effects as above can be obtained. In addition, by charging two or more kinds of the aqueous inks into the inkjet apparatus, and multi-colored image can be recorded as described above, and the same results and effects can be obtained.

The invention includes the following exemplary embodiments.

(1) An ink for inkjet recording, comprising:
a pigment coated with a water-insoluble resin including a structural unit represented by the following formula (1) and a structural unit having an ionic group; a nitrogen-containing organic solvent; resin particles; and water,
wherein a mass ratio [nitrogen-containing organic solvent/resin particles] is from 2.0 to 6.0:

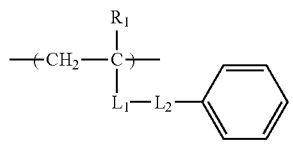
FORMULA (1)

wherein, in formula (1), $R_1$ represents a hydrogen atom, a methyl group, or a halogen atom; $L_1$ represents *—COO—, *—OCO—, *—CONR$_2$—, *—O—, or a substituted or unsubstituted phenylene group, wherein "*—" represents a bond linking to the main chain; $R_2$ represents a hydrogen atom, or an alkyl group having 1 to 10 carbon atoms; and $L_2$ represents a single bond or a divalent linking group having 1 to 30 carbon atoms.

(2) The ink for inkjet recording according to (1), wherein the structural unit represented by formula (1) is derived from benzyl(meth)acrylate or phenoxyethyl(meth)acrylate.

(3) The ink for inkjet recording according to (1), wherein, in formula (1), $R_1$ is a hydrogen atom or a methyl group.

(4) The ink for inkjet recording according to (1), wherein, in formula (1), $L_1$ is *—COO—.

(5) The ink for inkjet recording according to (1), wherein a content of the structural unit represented by formula (1) with respect to a total mass of the water-insoluble resin is from 50% by mass to 95% by mass.

(6) The ink for inkjet recording according to (1), wherein the structural unit having an ionic group is obtained by polymerization of an acrylic acid or methacrylic acid.

(7) The ink for inkjet recording according to (1), wherein the water-insoluble resin is a random copolymer.

(8) The ink for inkjet recording according to (1), wherein the acid value of the water-insoluble resin is from 30 mg KOH/g to 100 mg KOH/g.

(9) The ink for inkjet recording according to (1), wherein the nitrogen-containing organic solvent is a compound including a nitrogen-containing heterocyclic structure.

(10) The ink for inkjet recording according to (1), wherein the nitrogen-containing organic solvent is 2-pyrrolidone.

(11) The ink for inkjet recording according to (1), wherein a content of the nitrogen-containing organic solvent is 10% by mass or more.

(12) The ink for inkjet recording according to (1), further comprising methyl ethyl ketone at 1 ppm to 100 ppm based on mass.

(13) The ink for inkjet recording according to (1), further comprising a water-soluble organic solvent.

(14) The ink for inkjet recording according to (1), wherein the water-insoluble resin comprises a structural unit derived from a styrene-based macromer.

(15) An image forming method comprising applying the ink for inkjet recording according to (1) to a non-porous substrate.

(16) The image forming method according to (15), wherein application of the ink for inkjet recording is carried out using a thermal inkjet print head.

(17) The image forming method according to (15), wherein the non-porous substrate is a plastic sheet substrate, a plastic film substrate, a glass substrate, or a metal substrate.

(18) The image forming method according to (15), further comprising fixing an image by heating the non-porous substrate having the ink for inkjet recording applied thereto.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink for inkjet recording, comprising:
a pigment coated with a water-insoluble resin including a structural unit represented by the following formula (1) and a structural unit having an ionic group;
a nitrogen-containing organic solvent;
resin particles; and
water,
wherein a mass ratio [nitrogen-containing organic solvent/resin particles] is from 2.0 to 6.0:

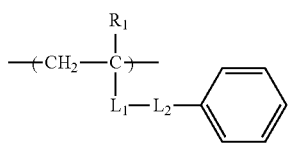

FORMULA (1)

wherein, in formula (1), $R_1$ represents a hydrogen atom, a methyl group, or a halogen atom; $L_1$ represents *—COO—, *—OCO—, *—CONR$_2$—, *—O—, or a substituted or unsubstituted phenylene group, wherein "*—" represents a bond linking to the main chain; $R_2$ represents a hydrogen atom, or an alkyl group having 1 to 10 carbon atoms; and $L_2$ represents a single bond or a divalent linking group having 1 to 30 carbon atoms.

2. The ink for inkjet recording according to claim 1, wherein the structural unit represented by formula (1) is derived from benzyl(meth)acrylate or phenoxyethyl(meth)acrylate.

3. The ink for inkjet recording according to claim 1, wherein, in formula (1), $R_1$ is a hydrogen atom or a methyl group.

4. The ink for inkjet recording according to claim 1, wherein, in formula (1), $L_1$ is *—COO—.

5. The ink for inkjet recording according to claim 1, wherein a content of the structural unit represented by formula (1) with respect to a total mass of the water-insoluble resin is from 50% by mass to 95% by mass.

6. The ink for inkjet recording according to claim 1, wherein the structural unit having an ionic group is obtained by polymerization of an acrylic acid or methacrylic acid.

7. The ink for inkjet recording according to claim 1, wherein the water-insoluble resin is a random copolymer.

8. The ink for inkjet recording according to claim 1, wherein the acid value of the water-insoluble resin is from 30 mg KOH/g to 100 mg KOH/g.

9. The ink for inkjet recording according to claim 1, wherein the nitrogen-containing organic solvent is a compound including a nitrogen-containing heterocyclic structure.

10. The ink for inkjet recording according to claim 1, wherein the nitrogen-containing organic solvent is 2-pyrrolidone.

11. The ink for inkjet recording according to claim 1, wherein a content of the nitrogen-containing organic solvent is 10% by mass or more.

12. The ink for inkjet recording according to claim 1, further comprising methyl ethyl ketone at 1 ppm to 100 ppm based on mass.

13. The ink for inkjet recording according to claim 1, further comprising a water-soluble organic solvent.

14. The ink for inkjet recording according to claim 1, wherein the water-insoluble resin comprises a structural unit derived from a styrene-based macromer.

15. An image forming method comprising applying the ink for inkjet recording according to claim 1 to a non-porous substrate.

16. The image forming method according to claim 15, wherein application of the ink for inkjet recording is carried out using a thermal inkjet print head.

17. The image forming method according to claim 15, wherein the non-porous substrate is a plastic sheet substrate, a plastic film substrate, a glass substrate, or a metal substrate.

18. The image forming method according to claim 15, further comprising fixing an image by heating the non-porous substrate having the ink for inkjet recording applied thereto.

19. The ink for inkjet recording according to claim 1, wherein the resin particles include polymer particles having a carboxy group and an acid value of 25 to 100 mg KOH/g.

20. The ink for inkjet recording according to claim 1, wherein the resin particles include a structural unit derived from a (meth)acrylate monomer containing an aromatic group, and a content of the structural unit in the resin particles is 10% by mass to 95% by mass.

* * * * *